United States Patent
Majid et al.

(10) Patent No.: US 7,343,075 B2
(45) Date of Patent: Mar. 11, 2008

(54) OPTICAL FIBERS WITH IMPROVED RESISTANCE TO INGRESSING MOLECULES

(75) Inventors: Imtiaz Majid, Shrewsbury, MA (US); Abdel Soufiane, Boston, MA (US)

(73) Assignee: Verrillon, Inc., North Grafton, MA (US)

( * ) Notice: Subject to any disclaimer, the term of this patent is extended or adjusted under 35 U.S.C. 154(b) by 0 days.

(21) Appl. No.: 11/780,257

(22) Filed: Jul. 19, 2007

(65) Prior Publication Data

US 2007/0263971 A1    Nov. 15, 2007

Related U.S. Application Data

(63) Continuation of application No. 11/061,987, filed on Feb. 18, 2005, now Pat. No. 7,266,276.

(51) Int. Cl.
   *G02B 6/036*    (2006.01)
   *G02B 6/02*    (2006.01)

(52) U.S. Cl. .............. 385/126; 385/123; 385/124; 385/125; 385/127; 385/128; 385/141

(58) Field of Classification Search ............. 385/100, 385/126, 123, 124, 125, 127, 128, 141
See application file for complete search history.

(56) References Cited

U.S. PATENT DOCUMENTS

| | | | |
|---|---|---|---|
| 4,715,678 A | 12/1987 | Johnson et al. | 385/100 X |
| 6,418,258 B1 | 7/2002 | Wang | 385/125 |
| 6,496,634 B1 * | 12/2002 | Levenson | 385/125 |
| 6,577,801 B2 * | 6/2003 | Broderick et al. | 385/125 |
| 6,968,107 B2 * | 11/2005 | Belardi et al. | 385/127 |
| 6,987,783 B2 * | 1/2006 | Fajardo et al. | 372/6 |
| 7,266,276 B2 * | 9/2007 | Majid et al. | 385/126 |
| 2003/0056550 A1 | 3/2003 | Tanaka et al. | 65/428 |
| 2004/0114897 A1 | 6/2004 | Koshiba et al. | 385/123 |
| 2004/0234221 A1 * | 11/2004 | Kringlebotn et al. | 385/128 |
| 2004/0247271 A1 | 12/2004 | Skovgaard et al. | 385/125 |
| 2005/0031867 A1 | 2/2005 | Majid et al. | 428/375 |
| 2005/0238309 A1 | 10/2005 | Drenzek et al. | 385/128 |

FOREIGN PATENT DOCUMENTS

| EP | 0 905 834 | 3/1999 | 385/128 |
|---|---|---|---|

OTHER PUBLICATIONS

Aikawa, H. et al., "Characteristics of Carbon-Coated Optical Fibers and Structural Analysis of the Carbon Film," International Wire & Cable Proceedings, pp. 374-380 (1993).

Birks, T.A. et al., "Full 2-D photonic bandgaps in silica/air structures," Electronics Letters, vol. 31, No. 22, pp. 1941-1943, (1995).

(Continued)

*Primary Examiner*—Brian M. Healy
(74) *Attorney, Agent, or Firm*—Goodwin Procter LLP

(57) ABSTRACT

An optical fiber includes a glass fiber having a glass core and a cladding that contains voids that are spaced apart from the core, in contact with the core, or form a substantial portion of the core. The voids act as trapping sites for ingressing molecules from the surrounding environment, thereby reducing the effect of such molecules on the fiber's light-transmission properties.

26 Claims, 7 Drawing Sheets

OTHER PUBLICATIONS

Cregan et al, "Single-Mode Photonic Band Gap Guidance of Light in Air" SCIENCE, vol. 285, pp. 1537-1539 Sep. 3, 1999.

Huff, R.G. et al., "TUG2 Amorphous carbon hermetically coated optical fibers," AT&T Bell Laboratories (1988).

Knight, J.C. et al., "All-silica single-mode optical fiber with photonic crystal cladding," Optics Letters, vol. 21, No. 19, p. 1547 (1996).

Pinnow, D.A. et al., "Reductions in static fatigue of silica fibers by hermetic jacketing," Appl. Phys. Lett. vol. 34 No. 1, pp. 17-19, (1979).

P.J. LeMaire et al., "Hydrogen Permeation in Optical Fibers with Hermetic Carbon Coatings," Electronic Letters, vol. 24, No. 21, p. 1323 (1988).

International Search Report and Written Opinion for PCT Appl. No. US2006/005440.

* cited by examiner

OPTICAL FIBERS WITH IMPROVED RESISTANCE TO INGRESSING MOLECULES

CROSS-REFERENCE TO RELATED APPLICATIONS

This application claims priority to, and the benefit of, U.S. Utility Application Ser. No. 11/061,987, filed on Feb.18, 2005, now U.S. Pat. No. 7,266,276, the disclosure of which is hereby incorporated by reference in its entirety.

FIELD OF THE INVENTION

This invention relates in general to optical fibers and specifically to optical fiber designs that provide increased resistance (with respect to optical performance) to ingressing molecules.

BACKGROUND

Optical fibers are finding increased applications in environments that are relatively harsh compared to traditional telecommunications operating conditions. For example, in geophysical and geothermal applications (e.g., oil well exploration), optical fibers are deployed in very diverse roles ranging from data logging (requiring high bandwidth fiber) to acting as distributed temperature and pressure sensing elements. The conditions that the optical fiber experiences in such applications can reach temperatures as high as several hundred degrees Centigrade and pressures of several hundred atmospheres in fluid (i.e., gaseous or liquid) environments that contain water, hydrogen, hydrocarbons, sulfides, etc. It is well known that traditional glass optical fibers are very susceptible to both hydrogen and moisture ingress, and therefore the use of optical fibers in such environments generally requires protection from ingressing substances in order to ensure proper function over extended periods of time.

The traditional approach to protecting optical fibers from harsh environments has been the application of an impervious coating on the surface of the glass. Many different coatings have been tried, including metals (see, e.g., Wysocki, "Reduction in Static fatigue of Silica Fibers by Hermetic Jacketing," *Applied Physics Letters* 34(1) (January 1979)), ceramics (see, e.g., U.S. Pat. Nos. 4,028,080 and 4,512,629) and carbon (see, e.g., U.S. Pat. No. 4,183,621 and Huff et al., "Amorphous Carbon Hermetically Coated Optical Fibers," Technical Digest for *Optical Fiber Communication Conference*, Paper TUG-2 (1988)). Metals tend to form polycrystalline structures in which the grain boundaries act as short-circuit diffusion paths and can themselves become rapidly corroded in harsh environments; additionally, even soft metals such as tin and aluminum tend to induce losses due to micro-bending.

Ceramic coatings, such as silicon nitride or silicon carbide, have been demonstrated to be effective in providing resistance to water at elevated temperatures and pressures (as evidenced by high stress-corrosion parameter values). For these coatings, however, the mean strength generally falls significantly below the value for standard polymer-coated glass fibers, and as is the case with metals, the high moduli of the coating materials tend to give rise to significant micro-bending losses. Hence, neither ceramic nor metal coatings are ideal in terms of combining strength, hermeticity and resistance to bend loss in the same fiber.

Carbon coatings can provide these properties, however, at least at relatively low temperatures (about 100° C. or below). For example, at such temperatures saturation lifetimes with respect to hydrogen ingress are on the order of years; micro-bending is minimal (for relatively small coating thicknesses) and mean strength, while on average probably still below the optimal values obtained for polymer-coated fibers, can be improved with process/roughness control during the deposition of the carbon. At temperatures above about 150° C., hermeticity with respect to hydrogen ingression starts to degrade, and the strong exponential dependence of the diffusion coefficient of $H_2$ through the carbon coating makes it more permeable to $H_2$ at temperatures greater than about 100° C., with saturation being achieved in a matter of days. Carbon-coated optical fibers have been manufactured for some time (see Huff et al., supra), and the permeability of these coatings with respect to hydrogen diffusion has been extensively studied (see, e.g., LeMaire et al., "Hydrogen permeation in optical fibers with hermetic carbon coatings," *Electron Lett*. 24:1323-1324 (1988)). The time dependence of the change in attenuation (e.g., at 1.24 μm) due to hydrogen in the glass fiber is given by:

$$\Delta\alpha_{1.24}(t,T)/\{\Delta\alpha_{1.24}(\inf,T) \times P_{H2}\} = [1-\exp\{-(t-\tau_i)/\tau_f\}] \quad (1)$$

where $\Delta\alpha_{1.24}(t,T)$ is the change in attenuation (at 1.24 μm) after the fiber has been exposed to a hydrogen environment for time t at temperature T; $\Delta\alpha_{1.24}(\inf,T)$ is the change in attenuation when equilibrium has been reached between the fiber and the environment; and $P_{H2}$ is the hydrogen pressure. $\tau_i$ and $\tau_f$ are, respectively, the time constants for initial lag (before any increase in attenuation is observed) and the rate at which the attenuation increases at any given temperature T. Also, for relatively thin coatings, $\tau_i$ is generally much less than $\tau_f$. For relatively short times, then, equation (1) becomes $$\Delta\alpha_{1.24}(t,T)/\{\Delta\alpha_{1.24}(\inf,T) \times P_{H2}\} \approx [t/\tau_f] \quad (2)$$

A plot of the left side of equation (2) vs. time "t" should yield a line with slope $1/\tau_f$. $\tau_f$ and $\tau_i$ describe the permeation characteristics of the carbon coating. Larger values of $\tau_f$ imply a increasingly resistant coatings, and maximizing its magnitude has been the object of much research. Most studies to date that have tried to optimize the value of $\tau_f$ have focused on the carbon deposition conditions, precursor gases, and the like (see, e.g., U.S. Pat. No. 5,000,541 and Aikawa et al., *IWCS Proceedings* at 374 (1993)).

SUMMARY OF THE INVENTION

As discussed above, previous work relating to improving the performance of optical fibers in harsh environments has generally focused on modifying or optimizing the properties of the coating on the glass fiber surface. Researchers have met this goal with varying levels of success. For example, practical conditions in which suitable fibers can be employed may be restricted to temperatures below about 150° C., and even then, depending on the environment, the fibers may be able to withstand exposure only for relatively short periods of time. The present invention addresses the problem of in-diffusing molecules in an optical fiber immersed in a harsh environment by modifying and optimizing the design of the glass component of the fiber itself. In particular, the invention incorporates novel features in the structure of the glass fiber such that $\tau_f$ in equation (2) is increased by as much as one or two orders of magnitude. The invention also relates to hermetic coatings that can be used with the glass components disclosed herein. These coatings shield the fiber and improve the transfer of optical power in the fiber.

The ensuing description utilizes hydrogen as an illustrative example of an ingressing species due to its small molecular size, which renders it a particularly troublesome diffusant, and its well-known undesirable effects on light transmission through a fiber. It should be understood, however, that the invention is useful in mitigating the effects of virtually any ingressing species.

A fiber in accordance with the invention includes voids or gas trap lines (GTLs) that serve as sinks for ingressing molecules and can absorb a much higher concentration of ingressing molecules (in equilibrium) than the glass itself. If desired, the voids may contain reactive gases that combine with the in-diffusing species to form larger molecules that have much lower solubility and diffusivity in the glass. These molecules will therefore be present in the glass (core and cladding) at much lower concentrations. As a consequence of this design, the effect of the ingressing molecules (which have permeated into the glass fiber) on the fiber's light-transmission properties will be significantly reduced.

Fibers in accordance with the invention may be used alone or with an appropriate coating to seal the exterior of the fiber. Generally, forming voids within the fiber and/or applying hermetic coatings are the techniques described herein to control molecular ingression. Traditional fibers based upon total internal reflection principles and less conventional fibers based upon the photonic band-gap effect both benefit from the voids and coatings as disclosed herein. The wide range of possible fiber structures, core configurations, coatings and combinations thereof allow for fiber designs that are specifically tailored for a particular application and/or environment.

In particular, the hollow core embodiments offer many advantages. The preliminary hollow core fiber research suggests that these fibers may serve as the next generation of ultra-low loss transmission fibers. As the hollow core fibers operate via the photonic band-gap effect, the bulk of the light travels in air. As a result, very low loss transmission levels are theoretically possible. Additionally, hollow core fibers can achieve endless single mode operation. That is, some hollow core embodiments can guide a single mode regardless of the wavelength. In turn, this increases the fiber's potential bandwidth and makes it desirable for many applications. Finally, as the majority of the light is transmitted in air, molecular ingression has less of an effect on a hollow core fiber than a conventional core-based fiber.

Even though a hollow core fiber is less susceptible to ingressing molecules, shielding the glass portions of the fiber remains important. Furthermore, the need for shielding is even more important in core-based embodiments with glass cladding regions. If either type of fiber is exposed to a hydrogen rich environment, the fiber will stop transmitting light after a few days. However, if a suitable hermetic coating is applied to the exterior surface of the fiber, the same fiber under the same environmental conditions may remain functional for several years. Accordingly, different aspects of the invention incorporate hermetic coatings to prevent light attenuation in certain chemical environments.

Accordingly, in a first aspect, the invention provides an optical fiber with improved resistance to ingressing molecules, such as hydrogen molecules, having a cladding containing a plurality of voids that act as trapping sites for ingressing molecules. The optical fiber also includes a substantially hollow core for guiding at least a significant portion of incoming light and a hermetic coating on an outer surface of the optical fiber. The cladding surrounds the substantially hollow core.

The voids can extend longitudinally through the fiber. The voids can form a pattern of concentric rings to create a multidirectional barrier to ingressing molecules; alternatively, the voids may be disposed in a random pattern. In some embodiments, the voids contain at least one gas capable of reacting with the ingressing molecules. Examples of suitable gases include, but are not limited to, a halogen gas (e.g., chlorine, bromine, or iodine), oxygen, and nitrogen. In some embodiments, the optical fiber's hermetic coating includes, for example, at least one of a ceramic material, metal, or a carbon-based composition.

The voids may occupy at least 5% and preferably 10-30%, of the fiber's cross-sectional area. The substantially hollow core can include at least one void. Additionally, the cladding can include a plurality of abutting substantially cylindrical tubes, each of which surrounds at least one void. As a result, a cross section of the substantially hollow core can have a boundary with arcuate portions. Furthermore, the voids in the cladding can be arranged to enable single-mode or multi-mode light transmission.

In another aspect the invention provides an optical fiber with improved resistance to ingressing molecules. The fiber includes a core portion, a cladding and a hermetic coating on an outer surface of the optical fiber. The core portion, which is typically glass, guides at least a significant portion of incoming light. Additionally, the cladding surrounds the core portion and contains a plurality of voids. The voids constitute trapping sites for ingressing molecules. Furthermore, at least one of the voids is substantially proximate to the core portion. In addition to the voids, various aspects of the invention also include a hermetic coating disposed on the exterior of the fiber to prevent the ingression of damaging molecules. The hermetic coating can include at least one of a ceramic material, a metal, a nitride and a carbon-based composition (e.g. a phase of carbon, such as graphite).

The core portion can include a solid core. A solid core includes a continuous unitary length of glass. However, the optical fiber's core portion can also include a partially solid core. That is, for a partially solid core, voids partially or fully intercept the core (e.g., along the core boundary). In turn, this can create arcuate boundary segments.

In one embodiment, the voids cause the effective cladding index of refraction to differ sufficiently from the core index of refraction to confine light within the core. Also, the core portion can include a dopant that causes Raman scattering when the fiber is exposed to light.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1A:
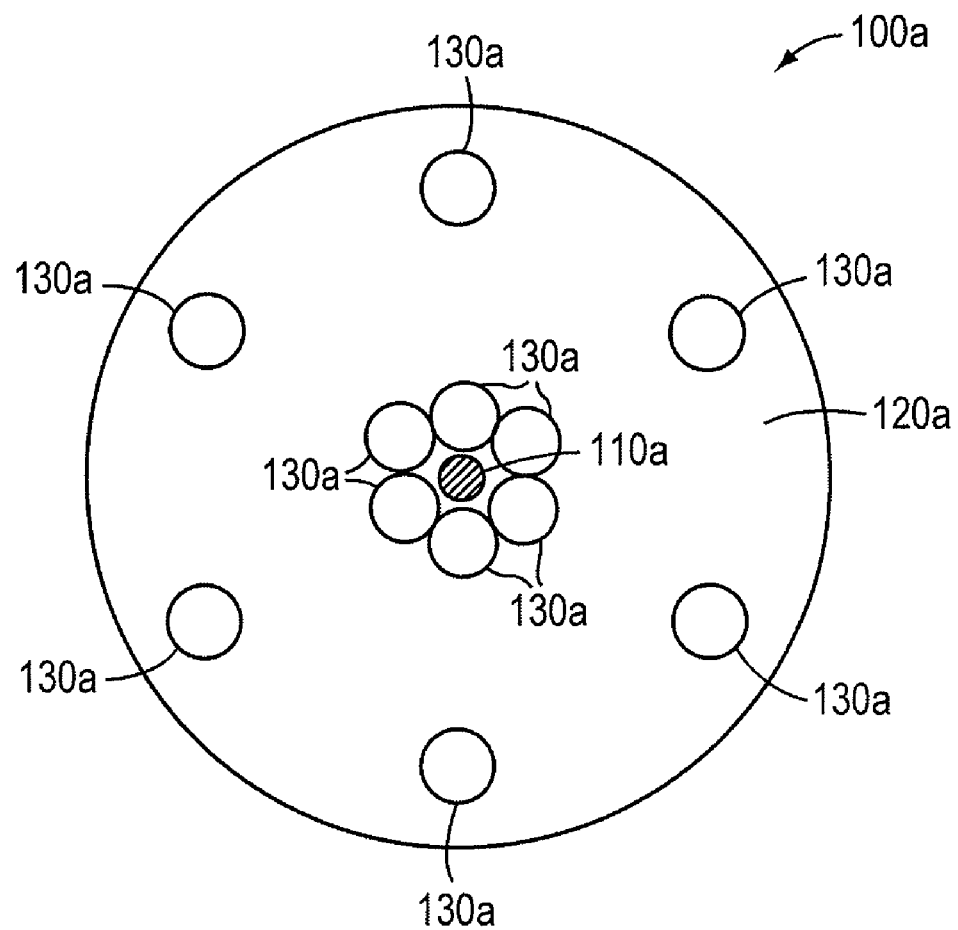
FIG. 1A is a cross-sectional view of an optical fiber according to an embodiment of the invention.

As shown in the sectional view of FIG. 1A, an optical fiber 100a with improved resistance to ingressing molecules comprises a core 110a in which at least a significant portion of the light is guided. The core 110a is surrounded by a cladding 120a that contains a plurality of voids 130a that act as trapping sites for ingressing molecules. The voids 130a may, for example, take the form of parallel longitudinal bores that concentrically surround the core 110a. Alternatively, the voids 130a may be of arbitrary or varying shapes, and may be located at organized or random locations within the cladding. For example, the cladding can include discrete voids (e.g., bubbles) dispersed throughout the cladding.

Adding voids to a fiber produces a quantifiable reduction in molecular ingression compared to an identical fiber that is free of voids. Similarly, increasing the sizes of the individual voids and/or the overall number of voids per fiber further reduces the concentration of ingressing molecules in the silica portion of the fiber. Additionally, adjusting the proximity of individual voids to the core and their relative positions to each other can also increase a fiber's overall resistance to ingressing species.

However, in traditional fibers, forming voids proximate to the core is generally avoided in order to reduce light loss into the voids. In environments rich in ingression molecules, such as petroleum drilling applications, the attenuation caused by migrating molecules often surpasses the losses caused by introducing voids to the fiber. Therefore, although counter-intuitive, increasing the total count of lossy elements (i.e., voids) in the fiber by including them near the core can be advantageous in certain fiber applications. Additionally, hermetic coatings, such as carbon based compositions, can also be used to shield the fiber and prevent contamination of any glass portions. Protecting the interior glass portions of the fiber with an exterior surface coating can significantly extend the operating lifetime of the fiber.

If still higher void densities are desirable, additional voids can be added to those proximate to the core. This results in a closely packed arrangement of neighboring voids that fill the cladding surrounding the core. Incorporating voids in the cladding proximate to the core can offer other advantages. Specifically, the presence of the voids can change the index profile of the portions of the cladding immediately surrounding the core. As a result, in addition to their trapping function, the voids can provide a light-guiding function in core-based fiber embodiments.

Figure 1B:
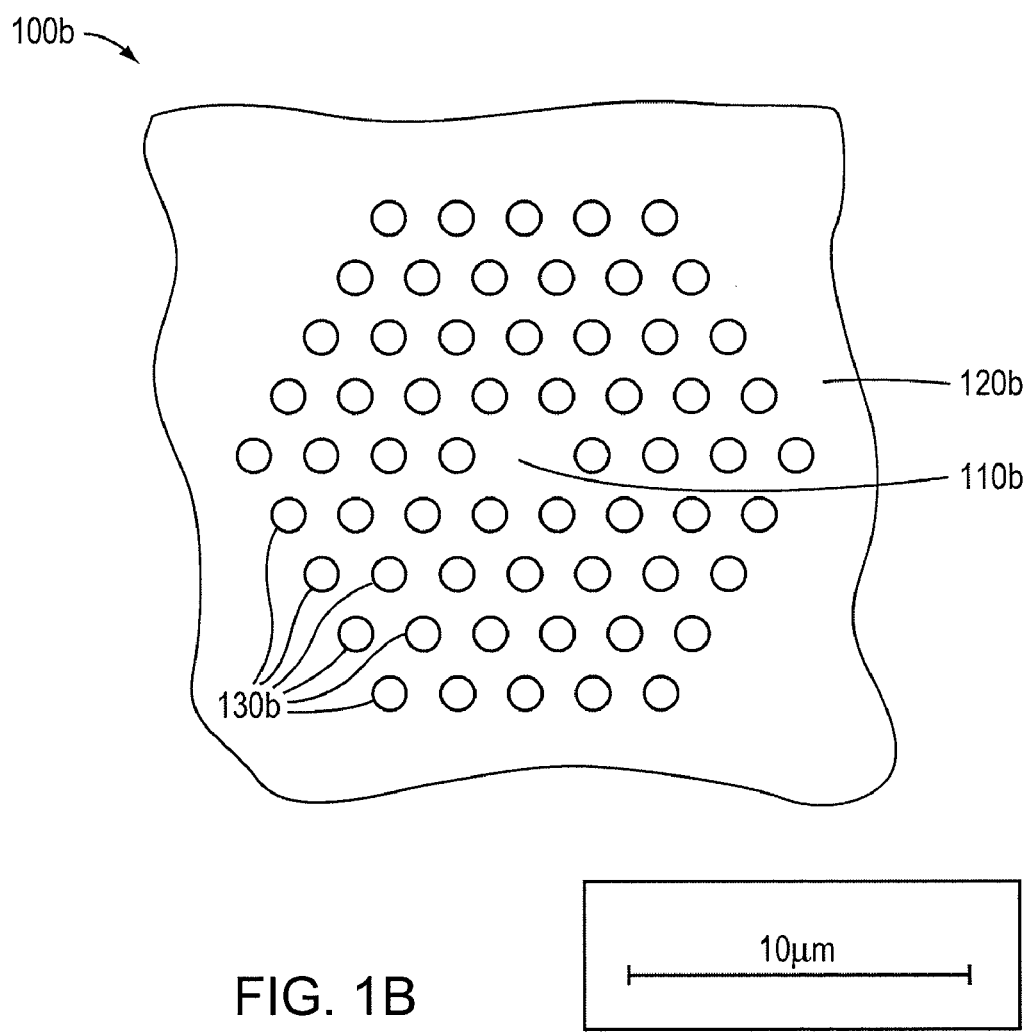
FIG. 1B is a cross-sectional view of an optical fiber according to another embodiment of the invention.

FIG. 1B shows an optical fiber 100b with improved resistance to ingressing molecules incorporating a core 110b in which at least a significant portion of the light is guided. As depicted in FIG. 1B only about 15-20 μm of the fiber cross-section contains voids 130b. However, if the arrangement of voids 130b is extended across the entire fiber cross-section, a large volume fraction of the cladding 120b will include voids. As the fiber 100b includes a distinct core 110b or at least a core portion, even with the increased volume fraction of voids, the bulk of the optical power travels in the core.

To enhance light confinement within the core 110b notwithstanding the proximity of voids 130b, the number and position of the voids in the cladding 120b can be used to adjust the cladding's index of refraction. Specifically, changing the size and/or number of voids in the cladding changes the cladding's overall (mean) index of refraction. This effective index is "tuned" to be lower than that of the core's index.

In other embodiments, a hollow core is used rather than a solid core. Specifically, hollow core includes one or more voids in lieu of a silica core. Therefore, either substantial all of the core or portions thereof themselves serve as voids. An exemplary hollow core fiber configuration is illustrated in FIG. 1C.

Figure 1C:
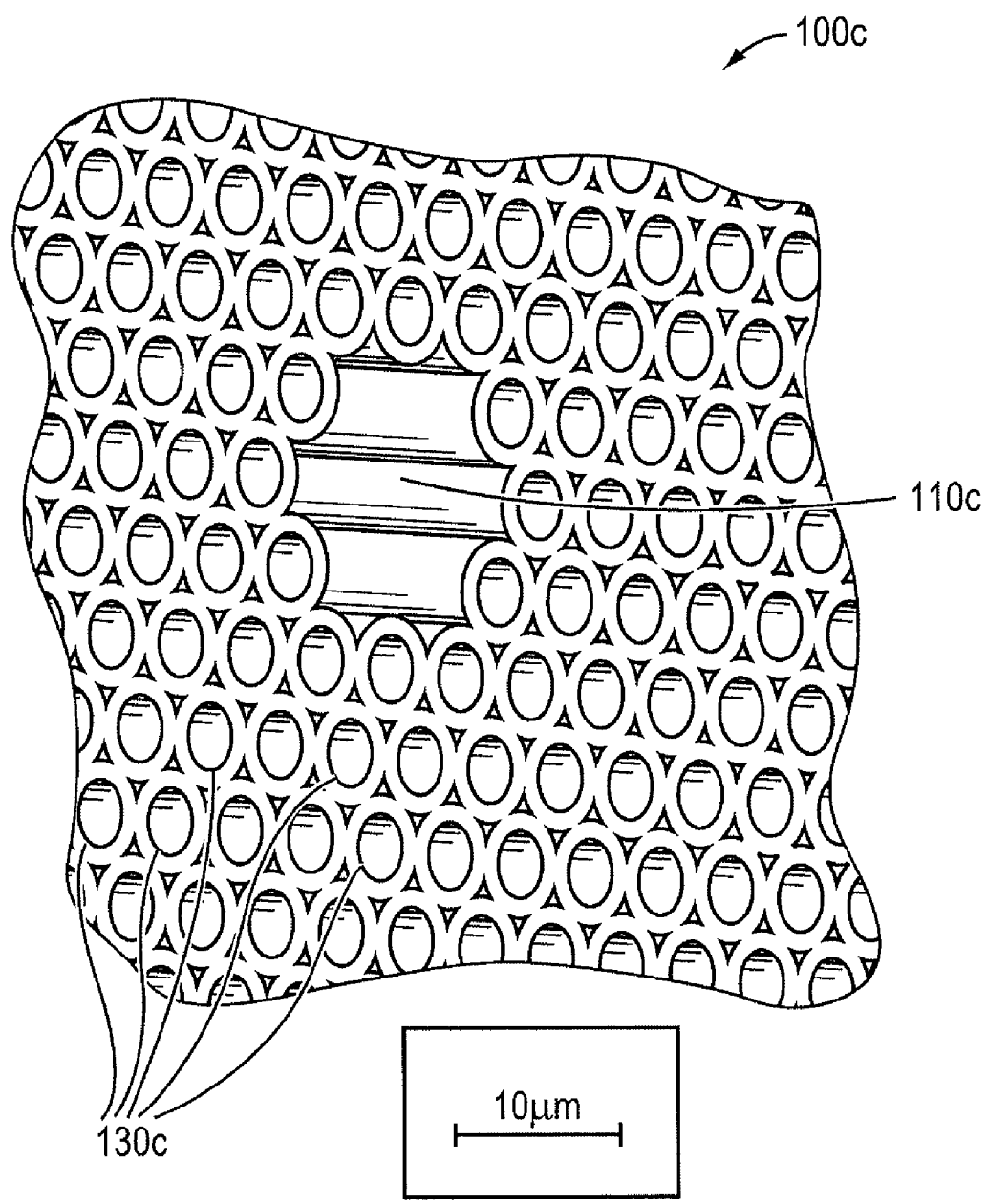
FIG. 1C is a cross-sectional view of a hollow core optical fiber according to an embodiment of the invention.

FIG. 1C shows a fiber 100c having a hollow core 110c. This specific embodiment illustrates a photonic crystal fiber based on the "band-gap effect." In hollow core fibers typically 90-95% of the power travels in the hollow core region. Because the bulk of the light travels in the voids 130c (90% in voids 130c and ~10% in the glass of the claddings 120) of the hollow core fiber 100c, the diffusion of the hydrogen (or other chemical) has a limited effect on the transmission properties of the light. However, transmission of light over long fiber lengths can result in substantial power losses due to the cumulative effect of hydrogen permeation into the glass. Therefore, a hermetic coating layer is desirably applied to the fiber surface to further reduce these losses. The benefits of a hermetic coating with regard to improved power transmission are discussed in more detail below.

Figure 1D:
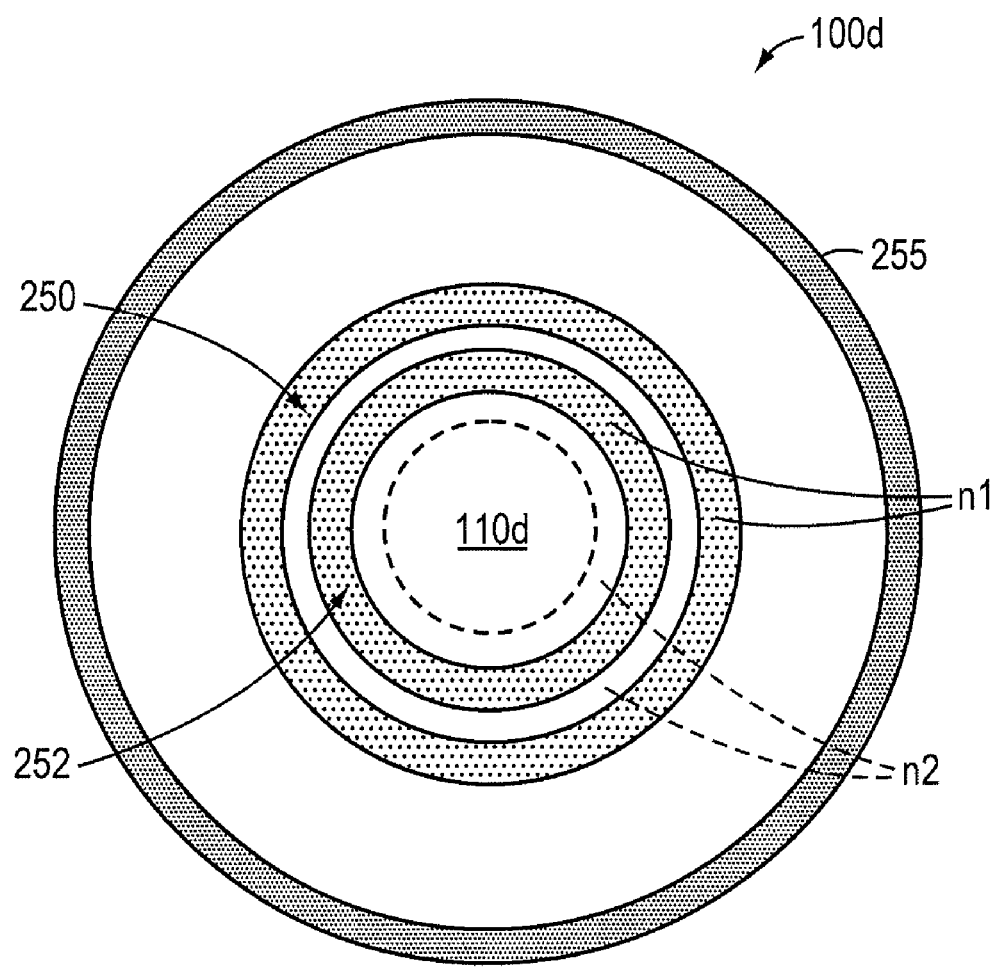
FIG. 1D is a cross-sectional view of an "omni-guide" hollow core optical fiber according to an embodiment of the invention.

FIG. 1D shows an example of another type of hollow core fiber. Specifically, an "omni-guide" fiber 100d having a hollow core 110d is illustrated. The fiber 100d includes two or more substantially concentric layers 250, 252 of a material (or materials) having a high index of refraction. Intervening cladding regions having a lower index of refraction are disposed between the layers 250, 252 as shown. The index of refraction ($n_1$, $n_2$, etc.) shifts radially in an alternating fashion and causes a large fraction of the total incident power to travel in the hollow region 110d. As a result, a substantially smaller amount of light travels in the region of alternating refractive indices. The multi-layer index contrasting region can contain many layers, e.g., ~15-20 in some embodiments. As is the case in the other embodiments discussed above, the use of a hermetic layer 255 on the outer surface of the fiber 100d will substantially inhibit the ingression of hydrogen (or other molecules) therein. In turn, this will extend the operating lifetime of the fiber when it is exposed to ingressing molecules in a hostile environment.

Since the invention enables both the core and cladding regions to function as gas trapping lines, substantially reducing the amount of hydrogen permeating the glass, the effects of hydrogen ingression on the optical transmission properties are greatly reduced. In contrast with prior art approaches, the current invention advantageous allows voids to pervade both the core and the cladding portion of the fiber or to serve as the core itself.

Fibers in accordance with the principles of the present invention can be manufactured from preforms, which can themselves be fabricated using techniques well known in the art, such as modified chemical vapor deposition (MCVD), chemical vapor deposition (CVD), plasma vapor deposition (PVD), or outside vapor deposition (OVD), although many other well-characterized techniques can also be used. A fiber preform is generally constructed using one of the aforementioned techniques, and the voids are introduced into the preform by, e.g., drilling, deliberately creating bubbles in the glass, or stacking tubes (within, around or constituting the preform) to create the void pattern before the fiber is drawn. The preform is then drawn into a fiber according to conventional practice.

When an optical fiber is immersed in a hydrogen atmosphere (or any other fluid environment), the hydrogen (or other fluid) molecules will quickly diffuse through the silica cladding and attain an equilibrium concentration in the glass (at reasonable operating temperatures). If there are any voids (i.e., GTLs) in the silica glass, then the hydrogen (or other fluid) molecules will diffuse through the silica glass to these pockets and progressively attain the equilibrium concentration therein. Hence, in equilibrium, the concentration of hydrogen in these pockets will be approximately 33 times (depending on the solubility of the gas molecule in the glass) the concentration of hydrogen in the glass. As a result, these pockets will serve as trapping sites for any hydrogen entering the glass and prevent migration of hydrogen toward the core where light is transmitted.

In a preferred embodiment intended for use in hydrogen-rich environments, the ratio of the concentration of $H_2$ molecules in the glass ($C_{glass}$) to that in the gas phase ($C_{gas}$) is approximately 0.03 and is relatively temperature-insensitive and pressure-insensitive (in the relatively low-pressure regime). In the exemplary configuration shown in FIG. 1, an optical fiber is designed with 10% of its cross-section occupied by GTLs, which are evenly distributed throughout the cross-section of the fiber. If $N_{out}$=concentration of hydrogen molecules in the fluid phase (outside the fiber), and $N_{inside}$=concentration of hydrogen molecules in the silica glass (inside the fiber), then, as explained above, $N_{inside}/N_{out} \sim 0.03$.

Figure 4:
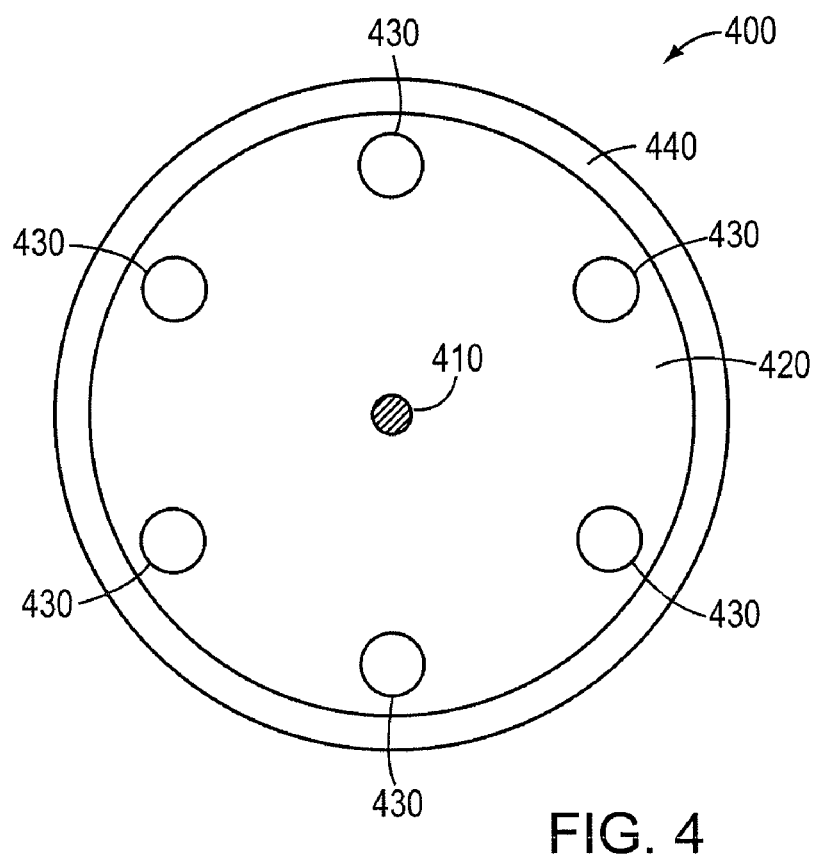
FIG. 4 is a cross-sectional view of an optical fiber that includes a hermetic coating according to another embodiment of the invention.

Consider now the kinetics of hydrogen diffusion through a hermetic (e.g., carbon) barrier on the surface of the optical fiber with voids near the periphery (as shown in FIG. 4). This essentially slows down the kinetics of hydrogen diffusion into the optical fiber. As the hydrogen molecules trickle into the fiber, they rapidly equilibrate within the glass fiber and locally find the GTLs; in these traps the hydrogen molecules quickly attain equilibrium with the silica glass, so the GTLs "absorb" approximately 33 times more hydrogen/unit volume than the silica glass. Therefore in a given period of time, if N hydrogen molecules entered through the hermetic barrier, in a conventional fiber they would disperse randomly throughout its cross-section A with a density N/A.

For the void-incorporating fibers of the present invention, by contrast, if the gas lines occupy an area $A_1$ of the cross-section of the fiber and contain $N_1$ ingressing molecules, and the rest of the fiber (silica glass) has a cross-sectional area $A_2$ and contains $N_2$ ingressing molecules, then the following relationships hold:

$$N = N_1 + N_2 \text{ and } A = A_1 + A_2 \quad (1)$$

$$N_1/A_1 = K_{g\text{-}s} N_2/A_2 \quad (2)$$

where $K_{g\text{-}s}$ is the solubility of the ingressing molecules in the gas phase relative to the silica glass and in the case of hydrogen has a value $K_{g\text{-}s} \sim 33$ Solving these equation for the ratio of $N_2/A_2$ yields a relation that describes the concentration of ingressing molecules (in the glass phase) in the presence of the GTL's as a function of the concentration of molecules in the absence of GTL's (N/A). Specifically, $N_2/A_2$ can be expressed as $$N_2/A_2 = N/(A - A_1 + K_{g\text{-}s} A_1) \equiv N/(\chi A) \quad (3)$$

As an example, if $A_1 = 0.10A$, with $K_{g\text{-}s} = 33$, then $N_2/A_2 = N/(4.2A)$.

This means that, where the GTLs occupy 10% of the fiber cross-section, the concentration of ingressing molecules in the silica glass will be 4.2 times less than N/A (i.e., the equilibrium value in the absence of the GTLs); this occurs simply because the bulk of the ingressing molecules tend to reside in the GTLs. If the cross-sectional area of the GTLs is increased to 20-30%, $$N_2/A_2 = N/(7.4A) \text{ for } A_1 = 0.20A, \text{ i.e.} \sim 7.4 \text{ fold}$$
$$\text{decrease in } H_2 \text{ concentration in glass}$$
$$= N/(10.6A) \text{ for } A_1 = 0.30A, 10.6 \text{ fold decrease in}$$
$$H_2 \text{ concentration in glass}$$

Even if the cross-sectional area occupied by the GTLs is only 3%, a two-fold decrease in $H_2$ concentration is observed:

$$N_2/A_2 = N/(1.96A) \text{ for } A_1 = 0.03$$

In the case of the optical fiber depicted in FIG. 1B, the bulk of the light is traveling in the silica glass. For fiber embodiments having voids or GTLs that extend throughout the cross-section of the fiber, it is reasonable to assume that approximately 50% of the cross-section is filled with holes (therefore $A_1 = 0.5A$). As a result, equation 3 can be used to obtain:

$$N_2/A_2 = N/(0.5A + (33)(0.5)A) = N/(17A) \equiv N/(\chi A)$$

For hollow core fibers, such as shown in FIG. 1B, the same analysis applies, i.e., for 50% GTL coverage the amount of hydrogen in the silica glass will be 17 times less than in the absence of the GTLs. Furthermore, since 90% of the light travels in the hollow core, the influence of the ingressing hydrogen molecules will be substantially less.

In each of the cases above, the concentration of H2 molecules in the glass has decreased by some factor $\chi$; since the attenuation of light in the fiber (equation 2), e.g., at 1.24 µm, is directly proportional to the concentration of H2 molecules in the glass, the cases above will give rise to a new effective τeff given by τeff=τf$\chi$. τeff is therefore the new time constant describing the effect of ingressing molecules on the optical fiber in the presence of a hermetic coating as well as the GTLs.

Figure 2:
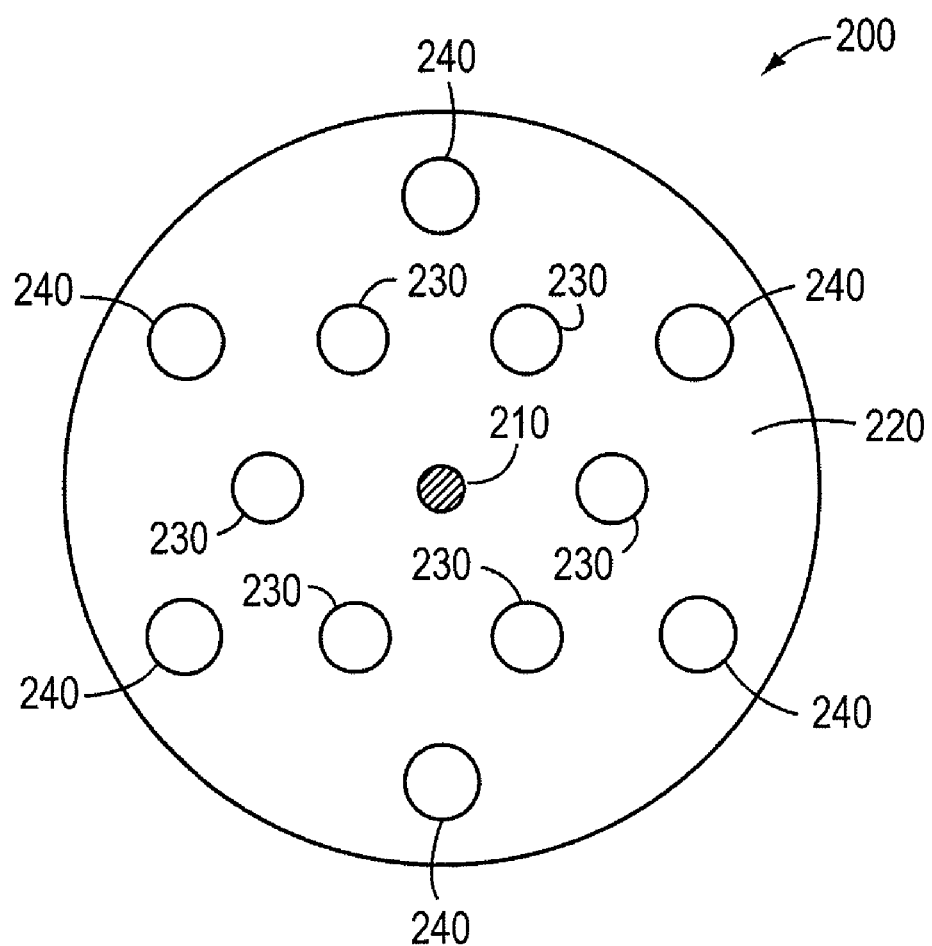
FIG. 2 is a cross-sectional view of an optical fiber according to another embodiment of the invention.
Figure 3:
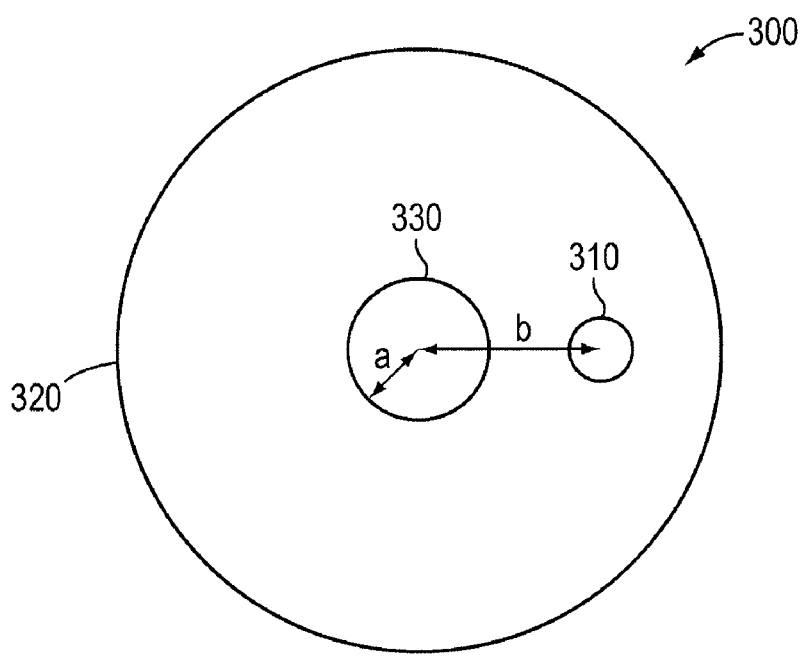
FIG. 3 is a cross-sectional view of an optical fiber that illustrates the relative positions of a core and a void according to an embodiment of the invention.

Another aspect of the invention relates to the distribution of GTLs in the cross-section of the fiber. This geometric pattern may be important in determining the kinetics of molecular diffusion into the core of the fiber; different patterns and arrangements may optimize the kinetics. An example of one arrangement is shown in FIG. 2. The inner concentric series of GTLs 230 in the cladding 220 (closer to the core 210 of the fiber 200) provides a barrier to ingressing molecules not trapped within the outer series of GTLs 240. The precise placement of the GTLs may also affect the strength of the fiber. It is desirable to distance the GTLs reasonably far from the core so as to not affect the optical properties of the fiber; this distance, however, will be determined both by the details of the fiber design and by the specifics of the application under consideration. In some cases (e.g., for multi-mode fiber) it may be desirable to place the GTLs in very close proximity to the core; in this case some light leakage (and therefore signal loss) may be considered acceptable in order to minimize molecular ingress to the core of the fiber such as illustrated by fiber 100b in FIG. 1B. In any case, light leakage can be minimized by using the GTLs themselves to input a sufficient refractive-index difference between core and cladding.

Although the hollow core fiber illustrated in FIG. 1C affords many advantages, it is often desirable to coat the surface of the fiber with a hermetic layer. The need for the coating can be modeled by considering power transmission and attenuation effects in a hollow core fiber. Let $P^o{}_h$ and $P^o{}_g$ be the power traveling in the hollow core and the silica glass, respectively, at an originating point "O" in the fiber. Similarly, let $P^f{}_h$ and $P^f{}_g$ be the power traveling in the hollow core and the silica glass, respectively, at some final distance L from the point "O" in the fiber. Furthermore, let the attenuation of the light in the hollow region be represented by some fraction $(1-\epsilon_h)$ and the attenuation in the glass by $(1-\epsilon_g)$ (e.g. $\epsilon=1$ implies lossless transmission). Because the ratio of power in the hollow core to that in the glass is a constant, the following relations hold (approximately, for small values of distance $\Delta L \Delta 1-\epsilon$):

$$P^o{}_h/P^o{}_g = C(\text{Constant}) = P^f{}_h/P^f{}_g \quad (4)$$

$$P^o{}_{tot} = P^o{}_h + P^o{}_g \quad (5)$$

$$P^f{}_{tot} = P^o{}_h\epsilon_h + P^o{}_g\epsilon_g \quad (6)$$

therefore $P^f{}_{tot}/P^o{}_{tot} = (P^o{}_h\epsilon_h + P^o{}_g\epsilon_g)/(P^o{}_h+P^o{}_g) = $ Fraction of Power Remaining "$\epsilon$"

and finally, then, $\epsilon = (C\epsilon_h + \epsilon_g)/(C+1)$ (7)

Because $\epsilon_g$ is a function of time, depending on the hermeticity of the carbon coating and $\epsilon_h$ the attenuation factor of light in the voids will generally be a constant at low pressures and for symmetric molecules (e.g. $H_2$). A more complete, continuous mathematical treatment allows derivation of the complete absorption equation describing how the power changes as a function of distance traveled along the length of the fiber z. This is given by:

$$P(z) = P(z_o)10^{-\alpha Z/10} \quad (8)$$

Where $\alpha = (C\alpha_h + \alpha_g)/(C+1)$ (9)

and $\alpha_h$ and $\alpha_g$ describe the attenuation factors for the portion of light traveling in the holes and in the glass respectively. For a typical hollow core fiber let us assume C=9 (i.e., 90% of light travels in the holes and only 10% in the glass), and $\alpha_h$=000 dB/km (i.e., loss-less transmission in the holes), independent of hydrogen concentration; also let us assume a typical value of $\alpha_g$ to be 3 dB/km. This yields an effective attenuation factor (using equation 9) $\alpha$ of 0.27 dB/km. This level of power loss is tolerable in "down-hole" applications. In contrast, for an uncoated fiber in a hydrogen environment where the temperature is high enough for the hydrogen to react with the silica, $\alpha_g$ is typically very large, e.g. ~100 dB/km (in the vicinity of 1380 nm), and if we still assume that $\alpha_h$=000 dB/km, then the effective attentuation factor of the fiber, throughout its length, is given by (using equation 8) $\alpha$~10 dB/km. Therefore, over a 1 kilometer distance, allowing for hydrogen ingression and reaction of glass with hydrogen molecules, which will occur at temperatures over 150° C., the power in the fiber drops by a factor of ~10.

This is unacceptably high for the majority of optical fiber applications. Furthermore, this level of attenuation occurs on a very short time scale (several tens of hrs), especially at elevated temperatures. Therefore, even with only a small fraction of the light traveling in the glass portion, a hermetic coating may be required to restrict the ingression of hydrogen into the glass.

In the presence of a hermetic coating, it is meaningful consider the distribution of hydrogen molecules in the glass and the GTLs. Because the attenuation in the glass $\alpha_g$ will be reduced by a factor of $\chi$ (equation 3), assuming proportionality between attenuation factor and hydrogen concentration, due to the presence of the GTLs, equation (9) is replaced by $$\alpha(t) = (C\alpha_h + \alpha_g(t)/\chi)/(C+1) \quad (10)$$

here $\alpha_h$ and $\alpha_g(t)$ express the attenuation factors with a hermetic coating present. The values of $\alpha_g(t)$ will therefore be significantly less than what one would expect if a hermetic barrier were not present, therefore giving rise to a much more transmissive fiber.

From these relations, it follows that using a hermetic coating in conjunction with the hollow core fibers offers significant benefits. Specifically, the hollow core fibers provide a double benefit to the hydrogen-resistance problem in optical fibers. First, since the bulk of the light travels in the hollow core, molecular ingression is less of an issue. Second, their intrinsic design provides large traps for in-diffusing hydrogen molecules. For at least these reasons, hollow core fibers with hermetic coatings as disclosed herein represent a significant improvement over the methods and structures of the prior art.

Referring to FIG. 4, if desired, a fiber 400 (which includes a core 410, a cladding 420, and one or more voids 430 as described herein) may be provided with a nominally hermetic coating 440 such as ceramic material, metal, or a carbon-based composition on the surface of the cladding 420 in order to provide an additional barrier inhibiting initial penetration of ingressing molecules into the fiber. These coatings can be applied to any of the foregoing fiber embodiments.

In another aspect of the invention, the ingressing molecule reacts with one or more gases in the GTLs. By introducing one or more highly reactive gases into the GTLs, it is possible to reliably initiate a reaction between the gas (e.g., $Cl_2$) and the ingressing molecule (e.g., $H_2$). This reaction preferably leads to the formation of one or more molecules larger than the ingressing species, and which therefore have a significantly reduced diffusivity and solubility in the glass relative thereto. The resulting reaction product is effectively excluded from the gas diffusion process in glass, and therefore cannot degrade the optical performance of the fiber. Care should be taken in choosing a gas species to ensure that a reaction will take place with the ingressing molecule at the temperatures of interest; in the case of ingressing $H_2$, this should be readily achievable with most halogenic gases. Examples of reactions that may take place inside the GTLs include:

$O_2 + 2H_2 \rightarrow 2H_2O$ $N_2 + 3H_2 \rightarrow 2NH_3$ $Cl_2 + H_2 \rightarrow 2HCl$ (similarly, $Br_2$ and $I_2$ produce 2HBr and 2HI, respectively)

If the concentration of reactive gases in the GTL is sufficiently high, then as the temperature increases (and as an increasingly greater number of molecules diffuse into the glass), the rate at which ingressing molecules react with the reactive gases (and are sequestered and thereby prevented from entering back into the glass) also increases. In some situations, therefore, the number of hydrogen molecules present in the glass does not increase with increasing temperature; or, at least, the rate of increase is significantly reduced in comparison to the case where no gas-phase reactions take place in the GTLs.

The reactive gas can be introduced into the GTLs in a variety of ways. For example, the gas can be added during the preform deposition process. For example, layers of under-sintered glass, preferably including volatile elements (e.g., boron or phosphorous), can be deposited prior to the regular core and cladding deposition. Small voids in the under-sintered glass will grow at high temperature during preform collapse, forming the desired gas-filled GTLs. Alternatively, glass powders (e.g., soot) can be applied on the outer surface of the preform, which will outgas and form bubbles during the jacketing process. Another method involves placing a jacket containing hydroxyl groups over a substrate that has a high chlorine content. Reaction between the hydroxyl groups and the chlorine form gaseous HCL bubbles during the jacketing process.

In other methods according to the invention, one or more reactive gasses are added to the preform prior to or during the fiber draw process. For example, the reactive gasses may be added to one end of a preform while the other end of the preform is being drawn into a fiber. After the fiber draw is complete, the reactive gases remain in the GTLs within the cladding.

Alternatively, the reactive gases may be introduced in a post-draw step. For example, in fiber embodiments that include continuous, longitudinal GTLs, the reactive gas may be fed through one end of the fiber. Once the gas has been added, the ends of the fiber are then sealed (e.g., by fusing or arcing), encasing the reactive gas within the GTLs. Alternatively, one end of the fiber may be closed prior to feeding the gas through the remaining open end of the fiber. After adding the reactive gas, the open end of the fiber is closed, trapping the reactive gas within the GTLs. By separating the gas incorporation process completely from the draw process, the GTLs may be filled with reactive gases at fairly high pressures completely independent of fiber draw process parameters. Another advantage of this method is that a higher volume of gas can be injected into the GTLs (using high pressure), resulting in more reactive molecules available to bond with more hydrogen molecules and prevent diffusion of hydrogen to the fiber core, thus extending the fiber's useful lifetime.

The following example is meant to illustrate, not limit, the scope of the present invention.

EXAMPLE 1

In order to determine how optical fibers according to the invention perform under harsh environments, a single-mode test fiber was constructed containing 3 GTLs in its cladding. The test fiber core had a diameter of approximately 8 µm, and the diameter of the core plus the cladding was 125 µm. The GTLs were approximately equal in size and were randomly positioned within the cladding. The total cross-sectional area of the three GTLs was approximately 5-10% of the cross-sectional area of the core plus the cladding. The test fiber also included a hermetic carbon layer over the cladding and an outer polymeric coating for mechanical protection. A control fiber was also constructed using the same materials and having the same dimensions, but lacking GTLs.

An attenuation spectrum of a coiled 500 m length of the test fiber was recorded at ambient temperature and pressure using a PK2500 optical bench (Photon Kinetics, Beaverton, Oreg.). The test fiber coil was then placed in a chamber and heated to 185° C. under 1600 psi of hydrogen for 68 hours, at which point the test fiber was removed from the chamber and another attenuation spectrum was generated using the same PK2500 optical bench. The same procedure was repeated using the same length of the control fiber. The results of the experiments are summarized in the graph appearing in FIG. 5.

Figure 5:
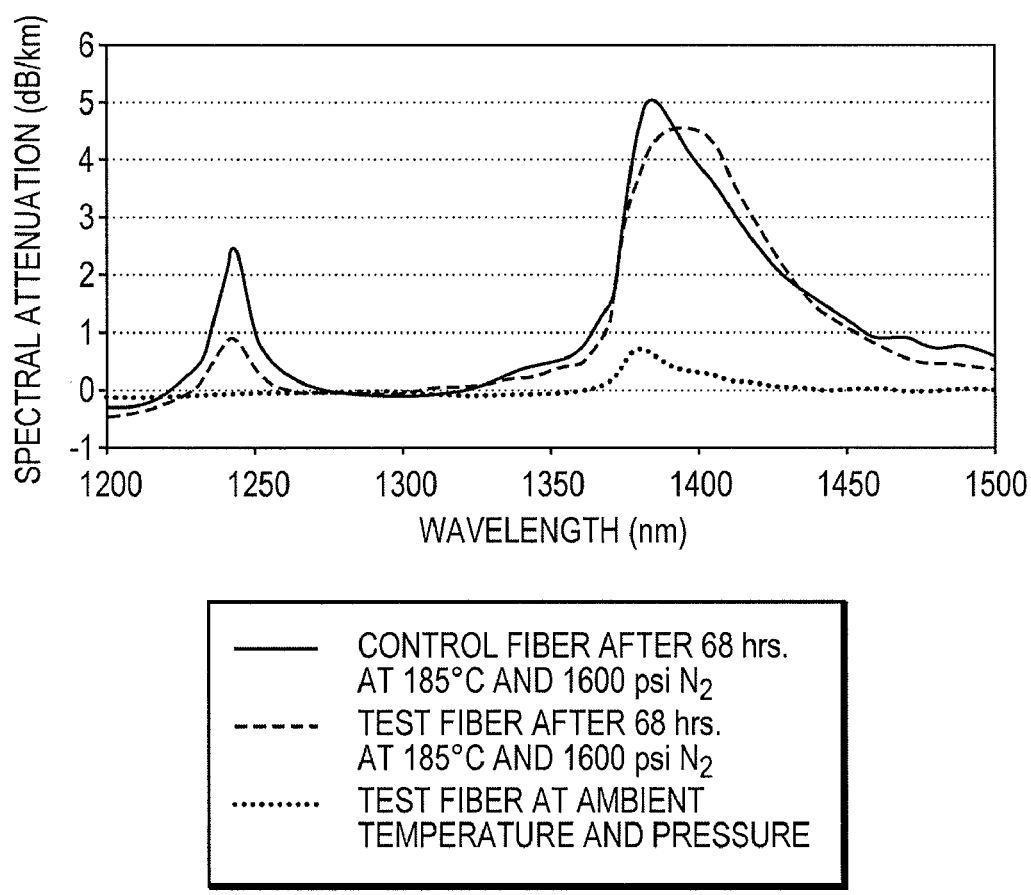
FIG. 5 is a graphical representation of the spectral attenuation of an optical fiber containing voids according to the invention and an optical fiber that does not contain voids.

Referring to FIG. 5, it is well-known that the absorption peak at ~1240 nm is characteristic of molecular hydrogen in silica glass, and the height of the peak correlates to the amount of hydrogen in the glass. The 1240 nm peak also includes a small contribution from hydroxyl group absorption, (equal to approximately 1/15 of the hydroxyl absorption peak at ~1390 nm) which can be subtracted from the 1240 nm peak. After performing the appropriate corrections on the absorption data, the height of the 1240 nm peak for the test fiber was ~0.6 dB/km, while the height of the 1240 nm peak for control fiber was ~2.2 dB/km. Thus, the test fiber suffered approximately 3.6 (e.g., 2.2/0.6) less attenuation due to hydrogen ingression than the control fiber, which implies that there was approximately 3.6 times less hydrogen in the core of the test fiber than in the control fiber. It should be noted that this experiment was performed on a fiber with a low GTL count (i.e., only 5-10% of the total area of the fiber cross-section). It is expected that the resistance to hydrogen ingression in the fiber core would increase significantly when more voids are disposed in the cladding.

The invention may be embodied in other specific forms without departing form the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

What is claimed is:

1. An optical fiber with improved resistance to ingressing molecules, the fiber comprising:
    a. a cladding containing a plurality of voids that act as trapping sites for ingressing molecules;
    b. unitary, single void, hollow core for guiding at least a significant portion of incoming light, the cladding surrounding the unitary, single void, hollow core; and
    c. a hermetic coating on an outer surface of the optical fiber.

2. The optical fiber of claim 1, wherein the fiber has a cross-sectional area, the voids occupying at least 5% of the cross-sectional area.

3. The optical fiber of claim 1, wherein the voids extend longitudinally through the fiber.

4. The optical fiber of claim 1, wherein the unitary, single void, hollow core comprises a void.

5. The optical fiber of claim 1, wherein a cross section of the unitary, single void, hollow core is substantially arcuate.

6. The optical fiber of claim 1, wherein the hermetic coating comprises at least one of a ceramic material, a metal, a nitride and a carbon-based composition.

7. The optical fiber of claim 1, wherein the cladding comprises a plurality of abutting substantially cylindrical tubes, each tube surrounding at least one void.

8. The optical fiber of claim 1, wherein the voids are arranged to enable single-mode or multi-mode light transmission.

9. The optical fiber of claim 1, wherein at least some of the voids are filled with at least one gas capable of reacting with the ingressing molecules.

10. The optical fiber of claim 9, wherein the gas comprises a halogen gas.

11. The optical fiber of claim 9, wherein the gas comprises at least one of oxygen, nitrogen and hydrogen.

12. An optical fiber with improved resistance to ingressing molecules, the fiber comprising:
   a. a core portion for guiding at least a significant portion of incoming light, the core portion having a core index of refraction;
   b. a cladding surrounding the core portion and having an effective cladding index of refraction, wherein:
      i. the cladding contains at least three voids;
      ii. the voids constitute trapping sites for ingressing molecules;
      iii. the voids cause the effective cladding index of refraction to differ sufficiently from the core index of refraction to confine light within the core; and
      iv. at least one of the voids is substantially proximate to the core portion; and
   c. a hermetic coating on an outer surface of the optical fibers,
wherein the core portion causes Raman scattering.

13. The optical fiber of claim 12, wherein the hermetic coating comprises at least one of a ceramic material, a metal, a nitride and a carbon-based composition.

14. The optical fiber of claim 12, wherein the cladding comprises a plurality of abutting substantially cylindrical tubes, each tube containing at least one void, at least one tube abutting the core whereby the void therein is substantially proximate to the core.

15. The optical fiber of claim 12, where the voids form a pattern of concentric rings to create a multidirectional barrier to the diffusion of ingressing molecules toward the core portion.

16. The optical fiber of claim 12, wherein the fiber has a cross-sectional area, the voids occupying at least 5% of the cross-sectional area.

17. The optical fiber of claim 16, wherein the voids occupy between about 10% to about 30% of the cross-sectional area.

18. The optical fiber of claim 12, wherein the fiber comprises radially successive cladding layers, adjacent ones of which have different refractive indices.

19. An optical fiber with improved resistance to ingressing molecules, the fiber comprising:
   a. a core portion for guiding at least a significant portion of incoming light; and
   b. a cladding surrounding the core portion and having an effective cladding index of refraction, wherein:
      i. the cladding contains at least three voids;
      ii. the voids constitute trapping sites for ingressing molecules; and
      iii. at least one of the voids is substantially proximate to the core portion; and
   c. a hermetic coating on an outer surface of the optical fiber, wherein the hermetic coating comprises a carbon-based composition, and
wherein the core portion causes Raman scattering.

20. The optical fiber of claim 19, wherein the hermetic coating comprises at least one of a ceramic material, a metal and a nitride.

21. The optical fiber of claim 19, wherein the cladding comprises a plurality of abutting substantially cylindrical tubes, each tube containing at least one void, at least one tube abutting the core whereby the void therein is substantially proximate to the core.

22. The optical fiber of claim 19, where the voids form a pattern of concentric rings to create a multidirectional barrier to the diffusion of ingressing molecules toward the core portion.

23. The optical fiber of claim 19, wherein the fiber has a cross-sectional area, the voids occupying at least 50% of the cross-sectional area.

24. The optical fiber of claim 19, wherein the voids cause the effective cladding index of refraction to differ sufficiently from the core index of refraction to confine light within the core.

25. The optical fiber of claim 19, wherein the core portion comprises a solid core.

26. An optical fiber with improved resistance to ingressing molecules, the fiber comprising:
   a. a core portion for guiding at least a significant portion of incoming light;
   b. a cladding surrounding the core portion and having an effective cladding index of refraction, wherein:
      i. the cladding contains a plurality of voids;
      ii. the voids constitute trapping sites for ingressing molecules; and
      iii. at least one of the voids is substantially proximate to the core portion; and
   c. a hermetic coating on an outer surface of the optical fiber, wherein the hermetic coating comprises a carbon-based composition, and
wherein the core portion comprises a solid core.

* * * * *